(12) United States Patent
Ruud et al.

(10) Patent No.: US 6,508,579 B1
(45) Date of Patent: Jan. 21, 2003

(54) LIGHTING APPARATUS FOR ILLUMINATING WELL-DEFINED LIMITED AREAS

(76) Inventors: Alan J. Ruud, 3057 Michigan Blvd., Racine, WI (US) 53140; Roger Buelow, II, 3629 Washington Blvd., Cleveland Heights, OH (US) 44118; John M. Davenport, 5138 Graham, Lyndhurst, OH (US) 44124; Eric J. Haugaard, 3838 - 5th Ave., Kenosha, WI (US) 53140; Juris Sulcs, 16575 Heatherwood La., Chagrin Falls, OH (US) 44023

( * ) Notice: Subject to any disclaimer, the term of this patent is extended or adjusted under 35 U.S.C. 154(b) by 0 days.

(21) Appl. No.: 09/568,209

(22) Filed: May 9, 2000

(51) Int. Cl.⁷ ............................................. G09F 13/00
(52) U.S. Cl. ..................... 362/551; 362/243; 362/269; 362/285; 362/580
(58) Field of Search ............................ 362/583, 580, 362/576, 581, 243, 364, 269, 285, 551, 554, 560

(56) References Cited

U.S. PATENT DOCUMENTS

| | | |
|---|---|---|
| 3,594,566 A | 7/1971 | Kneisley |
| 3,848,119 A | 11/1974 | Masson et al. |
| 4,012,630 A | 3/1977 | Gareis |
| 4,064,425 A | 12/1977 | Masson |
| 4,151,582 A | 4/1979 | Grunberger |
| 4,165,496 A | 8/1979 | Di Domenico, Jr. et al. |
| 4,344,110 A | 8/1982 | Ruediger |
| 4,428,031 A | 1/1984 | Mori |
| 4,463,986 A | 8/1984 | Sodder, Jr. et al. |
| 4,598,345 A * | 7/1986 | Kleeman .................... 362/286 |
| 4,799,137 A | 1/1989 | Aho |
| 4,865,417 A | 9/1989 | Naohiro et al. |
| 4,885,732 A | 12/1989 | Sunagawa et al. |
| 4,890,208 A | 12/1989 | Izenour |
| 4,911,516 A | 3/1990 | Palfrey et al. |
| 4,933,813 A | 6/1990 | Berger |
| 4,954,930 A | 9/1990 | Maegawa et al. |
| 4,994,946 A | 2/1991 | NakaMats |
| 5,005,108 A | 4/1991 | Pristash et al. |
| 5,043,850 A | 8/1991 | Dreyer, Jr. |
| 5,050,047 A | 9/1991 | Viner et al. |
| 5,064,276 A | 11/1991 | Endo et al. |
| 5,079,675 A | 1/1992 | Nakayama |
| 5,097,395 A | 3/1992 | Aho et al. |
| 5,126,923 A | 6/1992 | Hall, II |
| 5,130,908 A | 7/1992 | Simon |
| 5,233,679 A | 8/1993 | Oyama |
| 5,276,592 A | 1/1994 | Henkes |
| 5,365,412 A | 11/1994 | Koppolu et al. |
| 5,483,427 A | 1/1996 | Dealey, Jr. et al. |
| 5,897,201 A | 4/1999 | Simon |
| 5,915,823 A | 6/1999 | Simon |
| 6,045,250 A | 4/2000 | Simon |
| 6,302,571 B1 * | 10/2001 | Davenport et al. |

* cited by examiner

*Primary Examiner*—Thomas M. Sember
*Assistant Examiner*—Guiyoung Lee
(74) *Attorney, Agent, or Firm*—Jansson, Shupe & Munger, Ltd.

(57) ABSTRACT

A lighting apparatus mountable on a support and used for illuminating well-defined limited areas is provided. The apparatus includes a support frame pivotably mounted to the support thereby to allow the support frame to pivot about a predetermined axis, a light-generating system supported by the support frame, the light-generating system having a light source, a light-gathering/directing element, a guide rod and a reflector, the light-generating system generating one or more beams directed toward corresponding target areas, and preferably a shield for blocking non-reflected light.

35 Claims, 8 Drawing Sheets

LIGHTING APPARATUS FOR ILLUMINATING WELL-DEFINED LIMITED AREAS

FIELD OF INVENTION

The present invention relates to lighting apparatus and, in particular, to lighting apparatus for illuminating well-defined limited areas. Still more particularly, certain embodiments of this invention are related to ceiling-supported indoor lighting apparatus for illuminating specific well-defined limited areas.

BACKGROUND OF THE INVENTION

A wide variety of lamps and lighting apparatus have been used for illuminating limited areas such as wall areas, table or floor areas. Targeted illumination has been used for enhancing displays in various places and for purposes of general indirect lighting involving wall washing and/or lighting of other target areas or surfaces. Prior devices for targeted illumination of limited areas include, among other things, a variety of ceiling-mounted recessed lighting devices, track lighting devices and spotlights of various kinds.

Various lighting devices of the prior art have directed light from a light source onto a well-defined limited area by adjustment of means other than the light source. Examples include the structures disclosed in U.S. Pat. Nos. 5,130,908, 5,915,823, 5,897,201 and 6,045,250, issued to Jerome H. Simon.

There are a number of problems and shortcomings in certain prior art lighting devices for illuminating limited areas. It is to overcome such problems and shortcomings and to provide an improved lighting apparatus for illuminating, specific, well-defined limited areas that this invention is directed.

Certain devices of the prior art, including the devices of the aforementioned Simon patents, have light-generating and beam-establishing structures which are large and bulky, rather than compact and efficient in the use of space. For this reason, the entire lighting apparatus tends to be larger and more bulky than is sometimes desirable, and these qualities may limit the usefulness of such devices. Compactness and efficiency in use of space are important in a number of lighting applications.

In certain lighting applications, if arc lamps are used as light sources for illuminating well-defined limited areas the characteristics of the arc itself may be carried to an unacceptable extent into the final light pattern falling on the target—in what might be referred to as arc-imaging. This is an undesirable artifact. When the task is illuminating specific well-defined limited areas, it is typically very desirable that the light be of highly uniform character.

Certain devices of the prior art for illuminating well-defined limited areas tend to have unacceptable levels of light losses. In every lighting application, improved efficiency of light delivery is highly desirable.

Certain prior art devices such as the aforementioned Simon devices utilize a single light source to establish plural beams extending in different radial directions within a common plane. In devices utilizing a single light source to provide plural beams, it is highly desirable to establish such beams with minimal light losses.

Many lighting devices of the prior art used for illuminating limited areas require that the light beam direction be readjusted after replacement of the lamps in such devices. For example, if such a lighting device is illuminating a work of art hanging on a wall, the changing of the lamp often necessitates adjustment of the fixture to once again center the beam on the target. This need for redirecting lighting apparatus is time consuming and undesirable.

There is a continuing need in the field of lighting apparatus, particularly with lighting apparatus of certain types, for improvements in the ease of adjusting the apparatus to properly illuminate specific well-defined limited areas. Versatility of adjustment is highly desirable:

Many lighting devices for illuminating limited areas have significant stray-light emissions—emissions reaching areas other than the intended target area. This may be aesthetically displeasing and annoying. Eliminating or substantially reducing stray light emissions around and near the intended, well-defined target area is highly desirable.

A variety of lamps have been used in such devices, including among others, incandescent quartz halogen and metal halide lamps. Various recent developments regarding directional light sources and systems have been made, including those shown and described in the following co-pending, commonly-owned patent applications of Juris Sulcs, John M. Davenport and Roger F. Buelow II, all of whom are among the inventors of the instant patent herein: Ser. No. 09/454,073, filed Dec. 2, 1999, entitled "Efficient Arrangement For Coupling Light Between Light Source And Light Guide"; Ser. No. 09/470,156, filed Dec. 22, 1999, entitled "Method of Making Optical Coupling Device"; and Ser. No. 09/56527, filed May 5, 2000, entitled "Efficient Directional Lighting System."

OBJECTS OF THE INVENTION

Therefore, it is a primary object of the present invention to provide improved lighting apparatus for illuminating selected well-defined limited areas.

Another object of the invention is to provide an improved lighting apparatus for illuminating selected limited areas which has a light-generating and beam-establishing structure and overall structure, of compact size.

Another object of this invention is to provide an improved lighting apparatus for illuminating selected particular areas which is highly adjustable and easily usable.

Another object of this invention is to provide an improved lighting apparatus for illuminating limited areas which does not require re-targeting after replacement of lamps.

Another object of the invention to provide an improved lighting apparatus for excellent and highly efficient illumination of selected limited areas, avoiding the problem of arc-imaging.

Another object of this invention is to provide an improved beam-adjustable multi-beam lighting apparatus shielding light-generating elements from view.

Another object of this invention is to provide an improved lighting apparatus for illuminating limited areas which reduces or eliminates stray light emissions.

Still another object is of the invention is to provide a lighting apparatus for illuminating limited areas which has highly versatile adjustability.

Yet another object of the invention is to provide an improved single-light-source multi-beam lighting apparatus exhibiting high efficiency in light usage.

These and other objects of the invention will be apparent from the invention disclosure which follows.

BRIEF SUMMARY OF THE INVENTION

In accordance with the present invention, a lighting apparatus for illuminating well-defined limited areas is provided for mounting on a support such as a ceiling or the like. The lighting apparatus of this invention overcomes certain problems and shortcomings of the prior art, including those noted above, and provides a unique device satisfying a number of specific lighting needs.

The lighting apparatus of the invention, which is mountable on a support, includes: (1) a support frame mountable to the support; (2) a light-generating system on the support frame and including (2a) a light source, (2b) a light-gathering/directing element extending along a longitudinal axis and having an output, the light-gathering/directing element receiving light generated by the light source and directing it to the output, (2c) a guide rod extending along the longitudinal axis and having an input end in communication with the output end of the light-gathering/directing element and guiding light therethrough to an output end, and (2d) a reflector for receiving the light exiting the guide rod and reflecting the light toward a limited target area.

In certain highly preferred embodiments, the support frame is pivotably mounted to the support such that the support frame and the light-generating system supported thereon are pivotable about an axis transverse to the longitudinal axis.

In most embodiments, a second light-generating system, with each of the above-noted elements, is included in back-to-back alignment such that light is directed to first and second target areas. Most preferably, the first and second light-generating systems extend along a common longitudinal axis in first and second opposite directions and, most preferably, receive light from the same light source.

In preferred embodiments, each light-generating system also includes a first optical lens disposed between the output end of the guide rod and the reflector for modifying the light passing therethrough.

In preferred embodiments, the guide rod is formed from a thermally absorptive material so as to thermally isolate the first optical lens from the light source. Most preferably the guide rods are solid quartz rods. Each guide rod preferably has ultraviolet and infrared light-reflecting coating such that the input end of the guide rod reflects ultraviolet and infrared light generated by the light source and discourages the passing of the ultraviolet and infrared light through the guide rod.

In highly preferred embodiments include a shield interconnected to the support frame and having an opening therein, the reflector or reflectors (mirrors) reflecting light through an opening or openings in the shield to the target areas. Such shield preferably serves to prevent stray light emissions from exiting the structure.

In highly preferred embodiments, each reflector is pivotably mounted to the support frame thereby to allow the mirror(s) to be manipulated to orientations wherein the reflected light is directed to the target area(s). Preferably, such pivotable mounting is by ball-and-socket joints which connect the reflecting mirror to the support frame. Gimbal-mounting arrangements are equivalent.

In highly preferred embodiments the light-gathering/directing elements are compound parabolic collectors.

In certain preferred embodiments, the light-generating system further includes a first optical lens disposed between the output end of the guide rod and the reflector for modifying the light passing therethrough. A second optical lens may be disposed between the first optical lens and the reflector for further modifying the light passing therethrough.

It is preferable that the guide rod be a thermally absorptive material (like quartz, as mentioned above) to thermally isolate the first optical lens from the light source.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment. In the drawings.

DETAILED DESCRIPTION OF PREFERRED EMBODIMENTS

Figure 1:
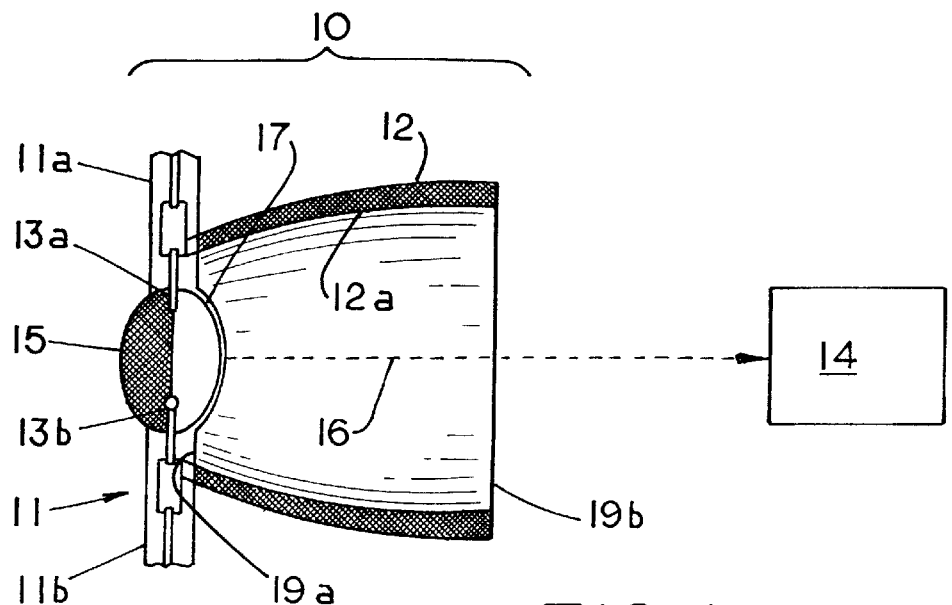
FIG. 1 is a side plan view, partially in cross section and partially in block form, of a lighting system in accordance with the present invention.

Referring to FIG. 1, a lighting system in accordance with the present invention is generally designated by the reference numeral 10. Lighting system 10 employs a lamp or light source 11 and a light light-gathering/directing element 12 for illuminating a target area 14. Lamp 11 is preferably an arc lamp having electrical in-leads 13a and 13b terminating in spaced electrodes within an arc chamber 17. Lamp 11 is powered by DC voltage to allow for a compact power supply and is oriented generally vertically and transverse to the direction of light propagation, as shown. Lamp 11 has spaced upper and lower electrodes, including an upper cathode and a lower anode associated with leads 13a and 13b, respectively.

In the preferred embodiment, lamp 11 may take the form of a conventional metal halide arc lamp with a longer arc gap than lamps producing a "point-like" light source, e.g., a 7 mm arc gap as opposed to a 2.7 mm arc gap. Length-to-width ratios of the resulting arcs are typically 8:1 for the longer gap as opposed to the range from about 1:1 to about 2:1 for the shorter gap. The longer gap results in: (1) greater efficiency in terms of lumens per watt; (2) lower loading on the wall of chamber 18 in terms of flux per unit area and lower pressure, so that the bulb wall can be thinner and lamp life longer; (3) less sensitive manufacturing tolerances, such as arc bulb thickness and arc gap length, resulting in lower cost; and (4) lower current, resulting in lower-cost wiring. Alternatively, lamp 11 may take the form of a filament-type halogen lamp, or an electrodeless lamp, by way of example.

Arc chamber 17 is partially disposed within the inlet end 19a of light-gathering/directing element 12 such that light generated by lamp 11 passes into light-gathering/directing element 12. It is contemplated to provide reflective member 15, shown cross-hatched, within lamp 11 in order to direct light from the left-shown side of lamp 11 into light-gathering/directing element 12 and to allow for a high amount of light to be transmitted through the light-gathering/directing element 12.

Light-gathering/directing element 12 is generally tubular and has a respective, interior light-reflecting surface 12a for receiving light at an inlet end 19a, nearest the lamp 11, and for transmitting the light to an outlet end 19b. Most of the inlet end of the light-gathering/directing element 12 preferably extends half-way across the lamp 11, from right to left, with recesses (unnumbered) for receiving the top and bottom arms 11a and 11b, respectively, of lamp 11 in order to maximize light extraction from the lamp 11. The light-gathering/directing element 12 increases in cross-sectional area from inlet end 19a to outlet end 19b in such manner as to reduce the angle of light reflected from its interior surface as it passes through the device, while transmitting it as a generally diverging light beam through the outlet end 19b. By "generally diverging" is meant that a substantial number of light rays diverge from main axis 16, although some rays may be parallel to the axis. Preferably, substantially all cross-sectional segments of surfaces 12a and 14a orthogonal to a main axis 16 of light propagation are substantially parabolic, or substantially conform to compound parabolic collector (CPC) shape. A CPC is a specific form of an angle-to-area converter, as described in detail in, for instance, W. T. Welford and R. Winston, High Collection Nonimaging Optics, New York: Academic Press, Inc. (1989), chapter 4 (pp. 53–76).

Lighting system 10 typically illuminates target area 14 with light having high spatial uniformity in both light intensity and color distribution. This is because light-gathering/directing element 12 conditions the light much more effectively than prior art reflectors (not shown) of the elliptical or parabolic type, for example. Typically, lighting system 10 can provide light to target area 14 within 30 to 35 degrees from main axis 16.

Traditionally, reflectors (not shown) control light from light sources in a so-called "imaging" method. Elliptical reflectors, for example, image the light source, positioned at a first focus of the reflector, onto a second focus. The controlled light converges from the surface of the reflector to the second focus as the light exits the reflector. Parabolic reflectors are another example of optics using imaging. In a parabolic reflector, the controlled light is collimated so that light rays exit in a generally parallel fashion. In contrast, the coupler of the present invention uses "non-imaging" optics, and, in preferred embodiments, realizes small size and superior light-mixing properties possible with such optics. As the light leaves a non-imaging collector (e.g., light-gathering/directing element 12), most of the light is controlled so as to be generally diverging at a directionally useful angle (up to 40 degrees or more) as it leaves the reflector. This is an important aspect of a lighting system since the light is most highly concentrated at the exit of the non-imaging collector (e.g., light-gathering/directing element 12). In contrast, in an elliptical system the light is most highly concentrated at the second focus. For a parabolic system, the light concentration is practically the same wherever it is collected. Although a parabolic system may have a high angular uniformity, its imaging quality typically precludes high spatial uniformity in light intensity and color.

Figure 2:
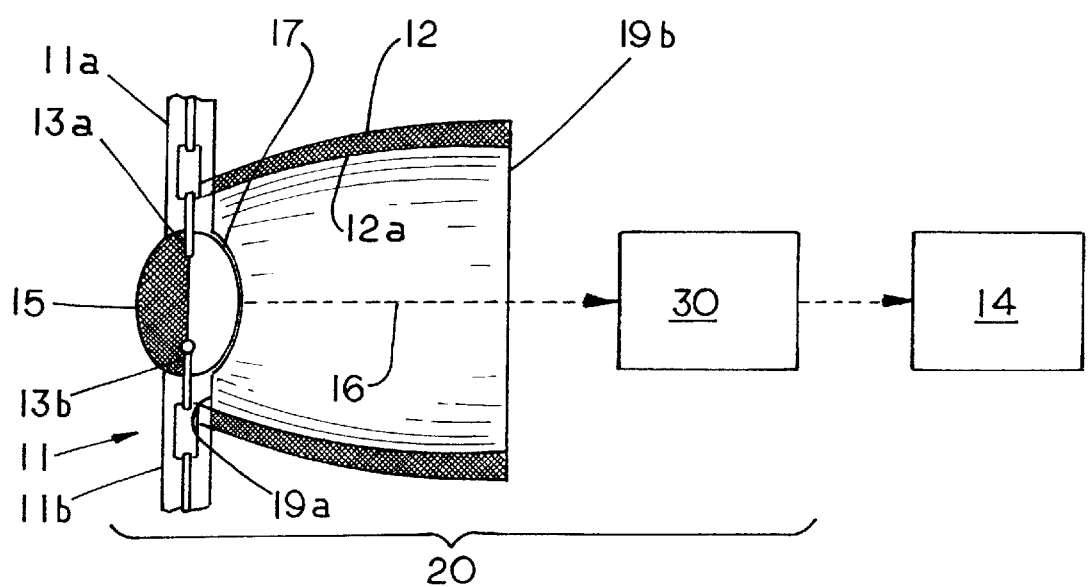
FIG. 2 is a side plan view, partially in cross section and partially in block form, of a further lighting system in accordance with the present invention.
Figure 3:
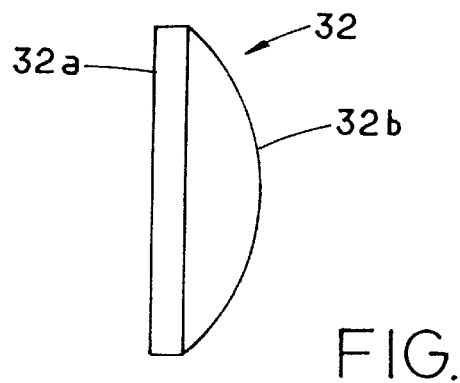
FIG. 3 is a side plan view of an optical lens.

FIG. 2 shows a lighting system 20 that is similar to lighting system 10 (FIG. 1). but which includes conditioning optics 30 between light-gathering/directing element 12 and target area 14. Due to the typically high spatial uniformity in light intensity and color, the conditioning optics can often comprise a single lens, e.g., plano-convex lens 32 of FIG. 3 having a planar surface 32a through which light rays (not shown) may be received and a convex surface 32b through which light rays may exit. Lens 32 will typically collimate light and change its angular distribution. It is further contemplated to use multiple lenses to provide the necessary conditioning optics, as hereinafter described. In addition, other types of lenses, such as Fresnel lenses, may be used without deviating from the scope of the present invention.

Figure 4:
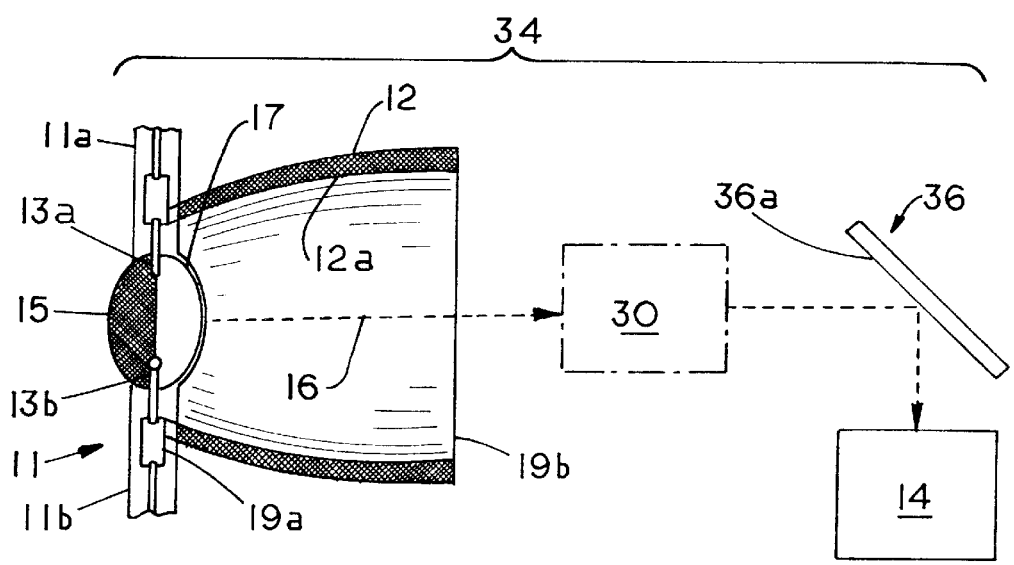
FIG. 4 is a side plan view, partially in cross section and partially in block form, of an alternate embodiment of a lighting system in accordance with the present invention.

FIG. 4 shows a light distribution system 34 that is similar to lighting system 20 (FIG. 2) but which includes a moveable mirror 36 with a reflective surface 36a for redirecting light from conditioning optics 30. Collection optics 30 are shown by a phantom-line box to indicate that it may be omitted if desired.

Figure 5:
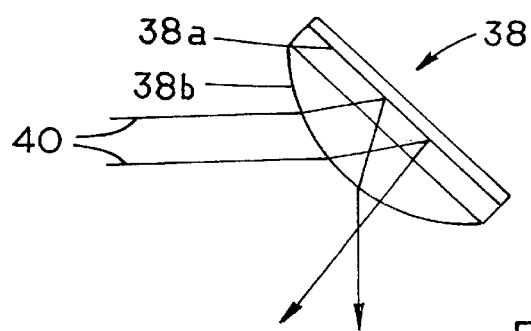
FIG. 5 is a side plan view of a mirror integrally formed on a lens for conditioning and redirecting light rays.
Figure 6:
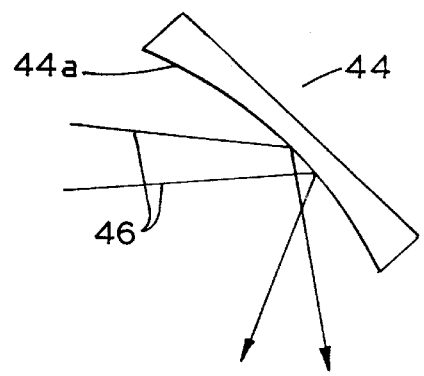
FIG. 6 is a side plan view of a curved mirror for conditioning and redirecting light rays.

The function of a lens[es] (conditioning optics) and mirror may be integrated into a single unit, such as unit 38 of FIG. 5. Unit 38 has a planar reflective surface 38a and a plano-convex lens 38b. Light ray 40 travels along a path as shown. An alternative unit 44, shown in FIG. 6, integrates both functions as well. Unit 44 comprises a mirror with a curved reflective surface 44a, for directing a light ray 46 in the path shown.

Figure 7:
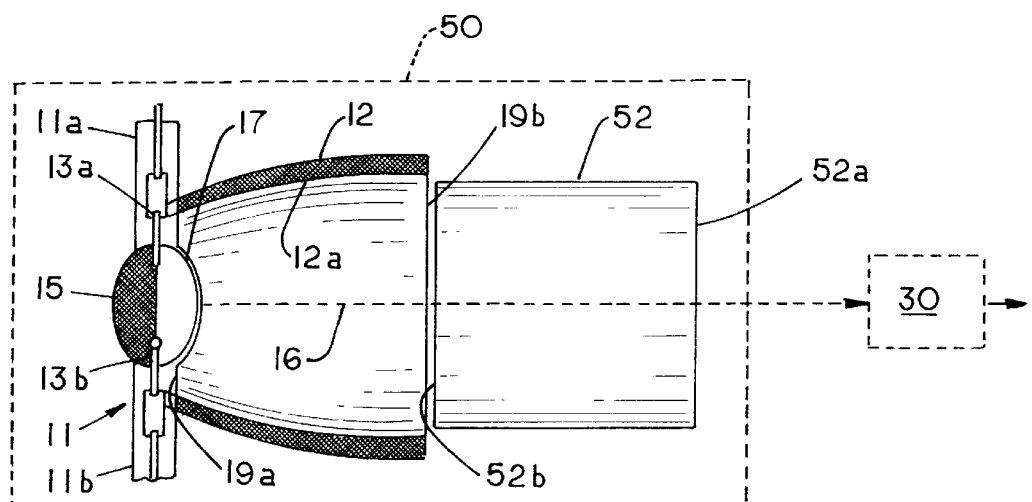
FIG. 7 is a side plan view, partially in cross section, of a still further embodiment of a lighting system in accordance with the present invention.

FIG. 7 shows a lighting system 50 including lamp 11 and light-gathering/directing element 12 as in FIG. 1. It also includes a guide rod or edge-defining member 52 for receiving a light beam from the light-gathering/directing element and transmitting it through an outlet 52a with its peripheral edge more sharply defined. Member 52 can be a solid or tubular quartz rod, by way of example, that can have IR or UV coatings or both on its left-shown inlet surface 52b. System 50 can replace lamp 11 and light-gathering/directing element 12 in FIGS. 1, 2, 4 or 7 such that conditioning optics 30 may be positioned downstream of the outlet 52a in order to condition the light exiting member 52 for reasons heretofore described.

Figure 11:
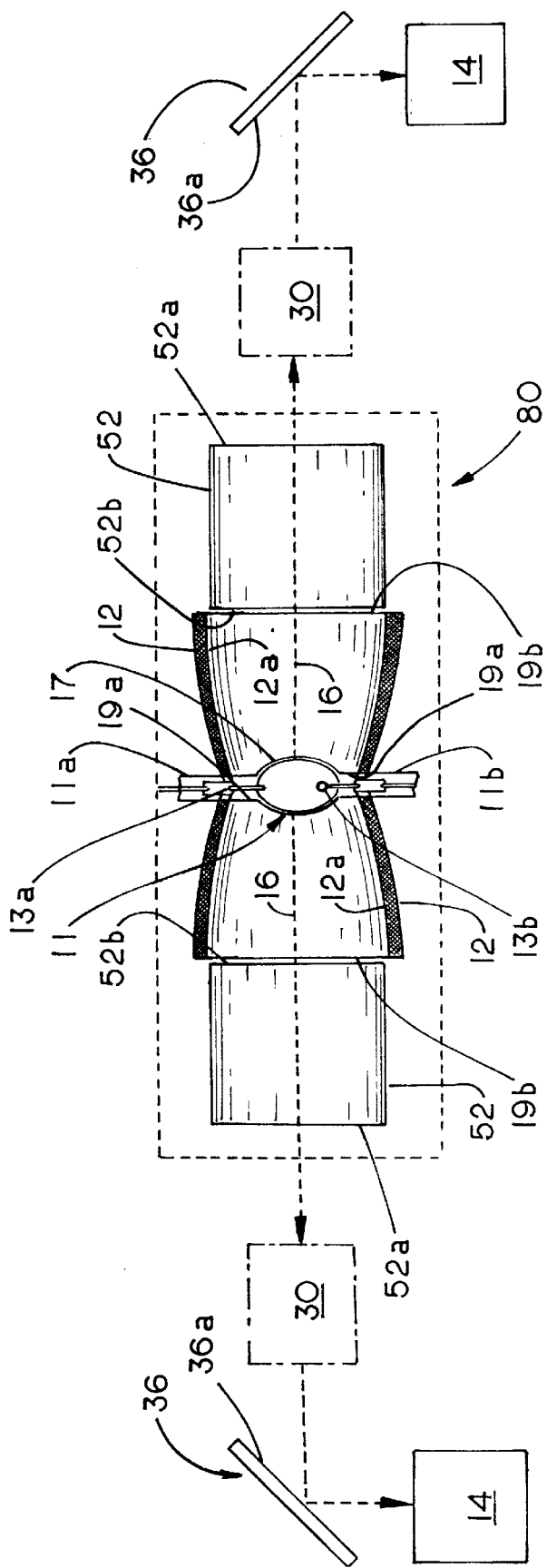
FIG. 11 is a side plan view, partially in cross section and partially in block form, of a still further embodiment of a lighting system in accordance with the present invention.

Referring to FIG. 11, an alternate lighting system 80 is provided which utilizes two light-gathering/directing elements 12 in a back-to-back relationship and two members 52. In this embodiment, lamp 11 does not include a reflective member such as reflective member 15 associated with lamp 11 of FIG. 1, so that light exits lamp 11 on both the right and left sides thereof. As such, light-gathering/directing elements 12 receive light from lamp 11 through inlet ends 19a. The light received within light-gathering/directing elements 12 is reflected along the interior surfaces 12a thereof so as to reduce the angle of the light and to create generally diverging light beams through the outlet ends 19b of light-gathering/directing elements 12.

Members 52 receive light beams from corresponding outlet ends 19b of light-gathering/directing elements 12 and transmit the light beams through outlets 52a thereof. It is contemplated to form members 52 from a thermally absorptive material so as to thermally isolate the conditioning optics 30 from lamp 11. It is further contemplated that members 52 perform a mixing function in order to homogenize the beam projecting from outlets 52a of members 52.

Conditioning optics 30 are disposed between outlets 52a of members 52 and corresponding mirrors 36. As heretofore described, conditioning optics 30 may comprise a single lens 32 for conditioning the beam of light passing therethrough. Alternatively, multiple lenses may be necessary in order to properly condition the beam of light or the beam of light may be transmitted from outlet 52a directly to target area 14 (FIG. 1) without the use of intermediate conditioning optics such as in FIG. 2.

Figure 8:
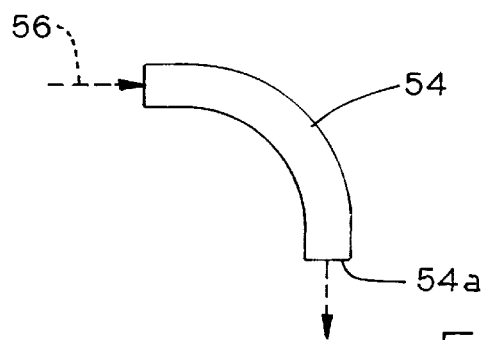
FIGS. 8 is a side plan view of an edge-defining member that may be used in the lighting system of FIG. 7.

Movable mirrors 36 with reflective surfaces 36a redirect the conditioned light received from conditioning optics 30 to target areas 14. By pivoting mirrors 36, the beams of light generated by lighting system 80 may be accurately provided to a target area 14. Alternatively, if redirection of the light is desired, an edge-defining member 54 with a bend, as shown in FIG. 8, can be used instead of member 52. For example, a light ray 56 received in the left-shown inlet of member 54 (FIG. 8) exits downwardly through outlet 54a.

Figure 9A:
FIGS. 9A–9D are cross sections of an edge-defining member of FIG. 7 or FIG. 8.
Figure 9B:
Figure 9C:
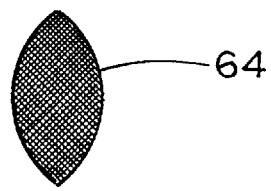
Figure 9D:
Figure 9E:
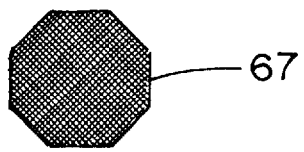

FIGS. 9A–9D show preferred cross sections of edge-defining member 52 (FIG. 7) or 54 (FIG. 8) along a main direction (not shown) of light propagation. FIG. 9A shows a rectangular cross section 60; FIG. 9B, a square cross section 62; FIG. 9C, an oval cross section 64; FIG. 9D, a trapezoidal cross section 66; and FIG. 8E, an octagonal cross section. Other shapes, e.g., pentagonal, can be used as will be apparent to those of ordinary skill in the art. It is known that some degree of spatial uniformity in light intensity and color results from using an edge-defining member in a conventional lighting system (not shown) using reflectors and, hence, imaging optics. However, for a square cross section, as in FIG. 9B, the length-to-width ratio of such member in a conventional system is typically about 8:1 to achieve good uniformity. The same degree of uniformity can be achieved (e.g., FIG. 1) with a much lower ratio in the present invention using non-imaging optics, e.g., about 2:1 to 3:1.

Figure 10:
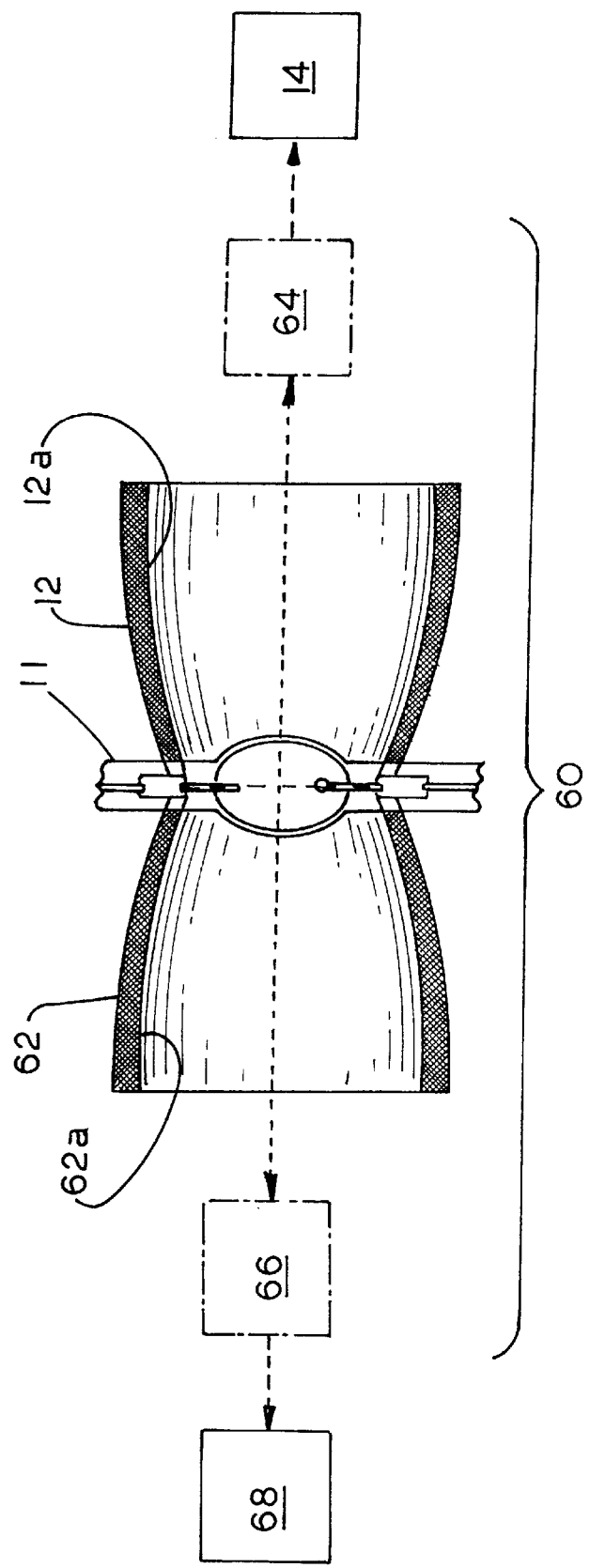
FIG. 10 is a side plan view, partially in cross section, of a still further embodiment of a lighting system in accordance with the present invention.

FIG. 10 shows a coupling system 60 using lamp 11 and light-gathering/directing element 12, as in FIG. 1, and a second light-gathering/directing element 62 preferably with the same construction as light-gathering/directing element 12. Light passing through light-gathering/directing element 12 may optionally be conditioned, redirected, or both by optional optics 64 (shown in phantom) before reaching target area 14. With lamp 11 omitting the reflective coating 15 of lamp 11 (FIG. 1), light passes also through light-gathering/directing element 62 with interior light-reflecting surface 62a, and optionally may be conditioned, redirected, or both by optics 66 (shown in phantom) before reaching target area 68. Optics 64 and 66 perform one or more optical functions as described above, for instance, with respect to lens 32 of FIG. 3, or mirror 36 of FIG. 4. More than two light-gathering/directing elements can be used if desired, but for six outputs, for instance, fiberoptic approaches may be preferable.

Figure 12:
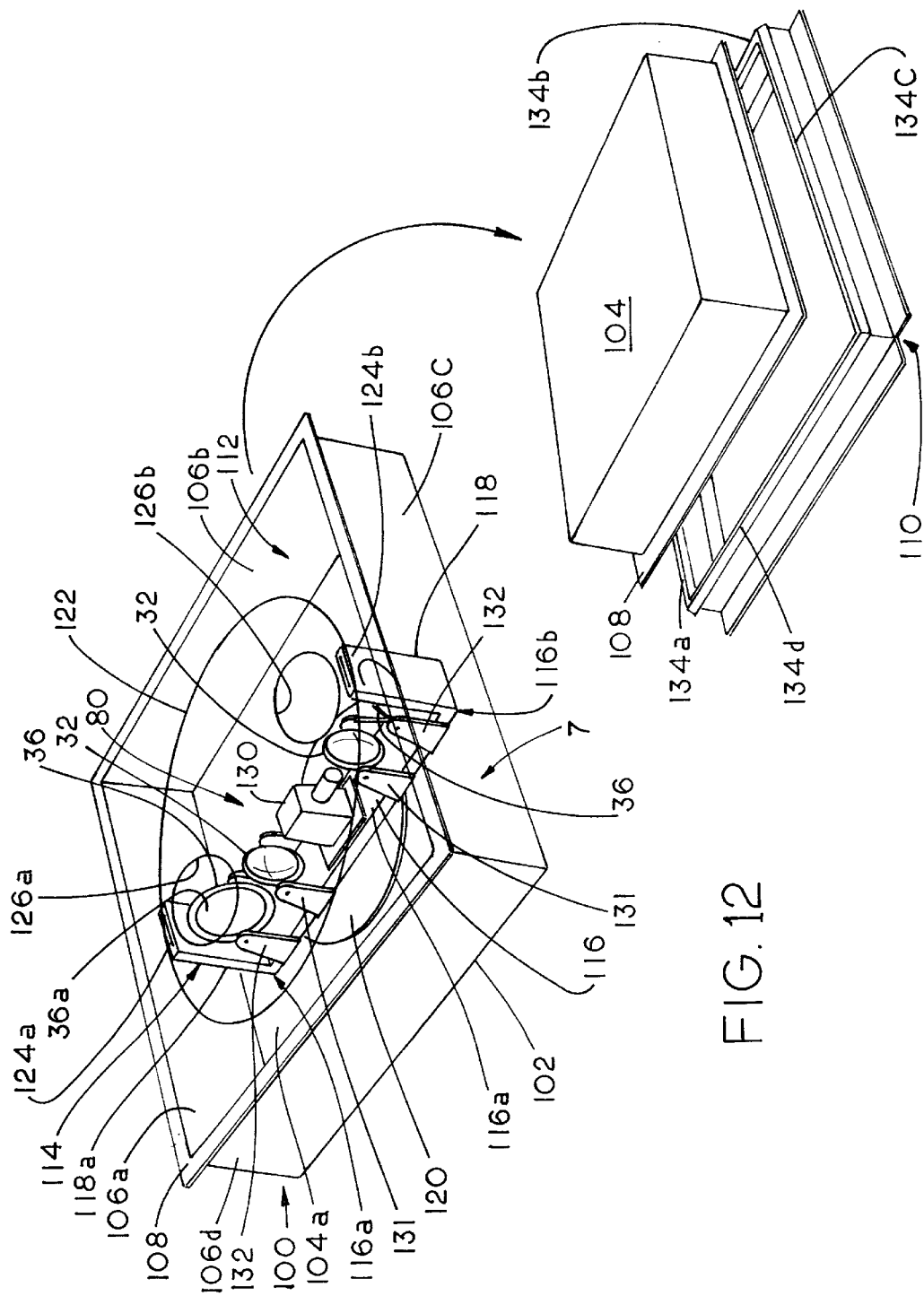
FIG. 12 is an isometric view of a lighting apparatus for housing a lighting system in accordance with the present invention.

Referring to FIG. 12, a lighting apparatus for supporting the various lighting systems heretofore described is generally designated by the reference numeral 100. Lighting apparatus 100 may include a box-shaped housing 102 having a base 104 and four sidewalls 106a–d projecting from the outer periphery thereof. Sidewalls 106a–d of housing 102 terminate at a mounting flange 108 which projects laterally therefrom. Mounting flange 108 is provided to facilitate the mounting of housing 102 within a ceiling structure 110, as hereinafter described.

Sidewalls 106a–106d of housing 102 define a lighting system receiving cavity 112 for receiving any of the lighting systems heretofore described. By way of example, lighting system 80 is shown mounted within housing 102. However, as previously noted, it is contemplated to mount other lighting systems as heretofore described within housing 102 without deviating from the scope of the present invention.

Figure 13:
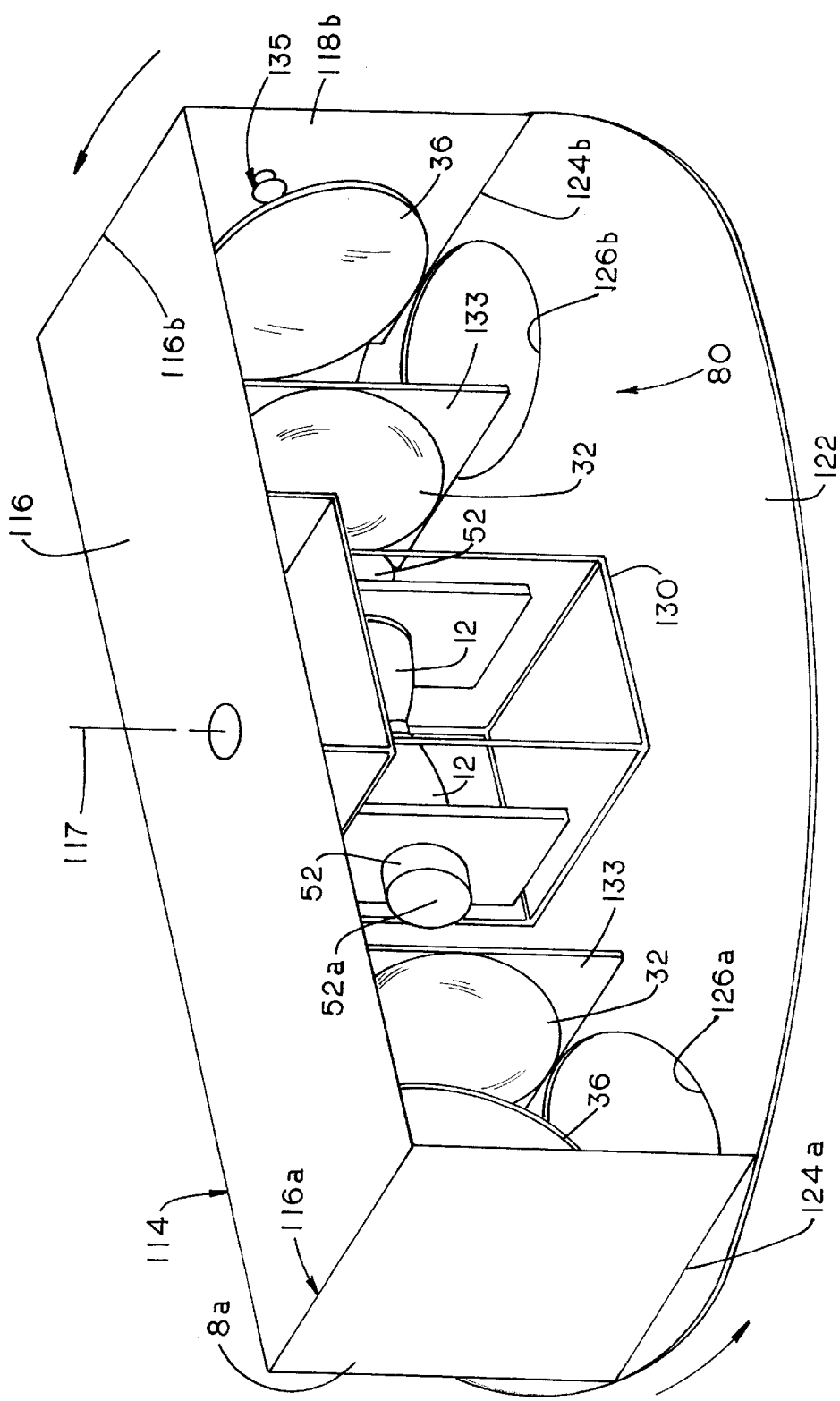
FIG. 13 is an isometric view of a lighting apparatus in accordance with the present invention.

As best seen in FIG. 13, lighting system 80 is supported on a generally U-shaped support frame 114. U-shaped support frame 114 includes an elongated base 116 having first and second opposite ends 116a and 116b. Legs 118a and 118b project from corresponding ends 116a and 116b, respectively, of base 116 at an angle generally perpendicular thereto. Legs 118a and 118b define a lighting system receiving area therebetween.

Base 116 is pivotally mounted to the inner surface 104a of base 104 of housing 102 thereby to allow support frame 114 to pivot about a predetermined axis 117 perpendicular to the longitudinal axis of base 116, as designated by the arrows in FIGS. 12 and 13. A plate 120, FIG. 12, may be disposed between base 116 and inner surface 104a of 104 to facilitate rotation of support frame 114 about axis 117 to a user-defined position.

A shield 112, FIG. 13, is mounted to the terminal ends 124a and 124b of corresponding legs 118a and 118b, respectively of support frame arm 114. Shield 122 is generally circular in shape and includes openings 126a and 126b therethrough which are aligned with corresponding mirrors 36, for reasons hereinafter described.

Support frame 114 further includes a sub-frame assembly 130 mounted to surface 116a of base 116 therein. Sub-frame assembly 130 supports light 11, light-gathering/directing elements 12 and members 52 along longitudinal axis 16 as heretofore described. Conditioning optics 30 such as lenses 32 may be positioned between corresponding mirrors 36 and outlets 52a of members 52. Lenses 32 may be supported on corresponding gimbals 130 in order to align lens with the reflective surfaces 36a of corresponding mirrors 36, FIG. 12, or rigidly mounted within frames 133 depending from base 116 of support frame 114, FIG. 13.

Mirrors 36 may also mounted on corresponding gimbals 132, FIG. 12, such as that the position of mirrors 36 may be adjusted by a user such that the light reflected thereof is directed to and illuminates target area 14. Alternatively, mirrors 36 may be mounted to support frame 114 by ball-and-socket joints 135, FIG. 13, which also allow a user to adjust the position of mirrors 36. Light reflected off mirrors 36 pass through openings 126a and 126b in shield 122 to illuminate the target areas 14. Shield 122 blocks non-reflected light (stray light) which would otherwise fall outside the target area.

In order to assemble light apparatus 100, housing 102 is positioned with ceiling structure 110 such that mounting flange 108 overlaps corresponding supports 134a–d. Mounting flange 108 of housing 102 is rigidly connected to supports 134a–d in order to mount housing 102 to ceiling system 110. Support frame 114 and mirrors 36 are positioned, as heretofore described, in order to illuminate target areas 14. It is contemplated to reorient the support frame 114 and/or readjust mirrors 36 if the locations of target areas 14 are changed.

While the invention has been described with respect to specific embodiments by way of illustration, many modifications and changes will occur to those skilled in the art. It is, therefore, to be understood that the appended claims are intended to cover all such modifications and changes as fall within the true scope and spirit of the invention.

We claim:

1. A lighting apparatus for mounting on a support for illuminating a limited target area, the lighting apparatus comprising:

a support frame mountable to the support; and a light-generating system supported on the support frame, the light-generating system including:

a light source for generating light;

a light-gathering/directing element extending along a longitudinal axis and having an output, the light-gathering/directing element receiving light generated by the light source and directing it to the output thereof;

a guide rod extending along the longitudinal axis and having an input end in communication with the output of the light-gathering/directing element and an output end, the guide rod guiding and homogenizing light received from the output of the light-gathering/directing element therethrough such that homogenized light exits the guide rod through the output end thereof; and a reflector for receiving the light exiting the guide rod and reflecting the light toward a limited target area.

2. The lighting apparatus of claim 1 wherein the support frame is pivotally mounted to the support such that the support frame and the light-generating system supported thereon are pivotable about an axis transverse to the longitudinal axis.

3. The lighting apparatus of claim 1 wherein the light-generating system further includes:

a second light-gathering/directing element having an output, the second light-gathering/directing element receiving light generated by the light source and directing the light to the output thereof;

a second guide rod having an input end in communication with the output of the second light-gathering/directing element and an output end, the second guide rod guiding and homogenizing light received from the output of the second light-gathering/directing element therethrough such that homogenized light exits the second guide rod through the output end thereof; and a second reflector for receiving light exiting the second guide rod and reflecting the light toward a second limited target area.

4. The lighting apparatus of claim 3 wherein the first light-gathering/directing element extends along the longitudinal axis in a first direction and the second light-gathering/directing element extends along the longitudinal axis in a second, opposite direction.

5. The lighting apparatus of claim 4 wherein the first and second light-gathering/directing elements receive light from the same light source.

6. The lighting apparatus of claim 1 wherein the light-generating system further includes a first optical lens disposed between the output end of the guide rod and the reflector for modifying the light passing therethrough.

7. The lighting apparatus of claim 6 wherein the light-generating system further includes a second optical lens disposed between the first optical lens and the reflector for further modifying the light passing therethrough.

8. The lighting apparatus of claim 6 wherein the guide rod is formed from a thermally absorptive material so as to thermally isolate the first optical lens from the light source.

9. The lighting apparatus of claim 1 wherein the guide rod is a solid quartz rod.

10. The lighting apparatus of claim 1 wherein the guide rod is formed from an ultraviolet and infrared light-reflecting material such that the input end of the guide rod reflects ultraviolet and infrared light generated by the light source and discourages the passing of the ultraviolet and infrared light through the guide rod.

11. The lighting apparatus of claim 10 wherein the guide rod is a solid quartz rod.

12. The lighting apparatus of claim 1 further comprising a shield interconnected to the support frame and having an opening therein, the reflector reflecting light through the opening in the shield to the limited target area.

13. The lighting apparatus of claim 12 wherein the shield blocks non-reflected light from exiting the apparatus.

14. The lighting apparatus of claim 1 wherein the reflector is pivotally mounted to the support frame thereby to allow the reflector to be manipulated to a position wherein the reflected light is directed to the limited target area.

15. The lighting apparatus of claim 14 further comprising a ball-and-socket joint for pivotally connecting the reflecting mirror to the support frame.

16. A lighting apparatus mountable on a support in order to illuminate a limited target area, the lighting apparatus comprising:

a support frame pivotally mountable to the support thereby to allow the support frame to pivot about a predetermined axis; and a light-generating system supported on the support frame, the light-generating system including:

a light source for generating light;

a light-gathering/directing element extending along a longitudinal axis and having an exit, the light-gathering/directing element gathering light generated by the light source and directing the light to the exit thereof;

a guide rod extending along the longitudinal axis and having an input end adjacent the exit of the light-gathering/directing element and an output end, the guide rod homogenizing light received from the light-gathering/directing element and directing the light from the input end to the output end thereof; and a reflector for receiving light from the guide rod and reflecting the light toward a limited target area; and a shield interconnected to the support frame and defining an opening, the reflector reflecting light through the opening in the shield to the limited target area.

17. The lighting apparatus of claim 16 wherein the light-generating system further includes:

a second light-gathering/directing element having an exit, the second light-gathering/directing element gathering light generated by the light source and directing the light to the exit thereof;

a second guide rod having an input end adjacent the exit of the second light-gathering/directing element and an output end, the guide rod homogenizing light received from the light-gathering/directing element and directing the light from the input end to the output end thereof; and a second reflector for receiving light from the second guide rod and reflecting light toward a second limited target area.

18. The lighting apparatus of claim 17 wherein the first light-gathering/directing element extends along the longitudinal axis in a first direction and the second light-gathering/directing element extends along the longitudinal axis in a second, opposite direction.

19. The lighting apparatus of claim 16 wherein the light-generating system further includes a first optical lens disposed between the output end of the guide rod and the reflector for modifying light passing therethrough.

20. The lighting apparatus of claim 19 wherein the light-generating system further includes a second optical lens disposed between the first optical lens and the reflector for further modifying the light passing therethrough.

21. The lighting apparatus of claim 19 wherein the guide rod is formed from a thermally absorptive material so as to thermally isolate the first optical lens from the light source.

22. The lighting apparatus of claim 16 wherein the guide rod is a solid quartz rod.

23. The lighting apparatus of claim 16 wherein the guide rod includes an ultraviolet and infrared light-reflecting material such that the input end of the guide rod reflects ultraviolet and infrared light generated by the light source and discourages the passing of the ultraviolet and infrared light through the guide rod.

24. The lighting apparatus of claim 23 wherein the guide rod is a solid quartz rod.

25. The lighting apparatus of claim 16 wherein the shield blocks non-reflected light from exiting the apparatus.

26. The lighting apparatus of claim 16 wherein the reflector is pivotably mounted to the support frame thereby to allow the reflector to be manipulated to a position wherein the reflected light is directed the limited target area.

27. The lighting apparatus of claim 16 wherein the light-gathering/directing element is a compound parabolic collector.

28. A lighting apparatus mountable on a support in order to illuminate limited target areas, the lighting apparatus comprising:
 a support frame pivotably mountable to the support thereby to allow the support frame to pivot about a predetermined axis; and
 a light-generating system supported on the support frame, the light-generating system including:
  an arc lamp generating light from an arc chamber;
  first and second compound parabolic collectors lying on a common axis in a back-to-back relationship, each compound parabolic collector receiving a portion of the arc chamber therein and having an exit such that the compound parabolic collectors gather light generated by the arc chamber and direct the light to the exit thereof;
  first and second guide rods lying on the common axis and having input ends adjacent corresponding exits of the compound parabolic collectors and output ends, the guide rods homogenizing light received from corresponding compound parabolic collectors and directing the light from the input ends to the output ends thereof;
  a pair of first optical lenses disposed downstream of corresponding output ends of the guide rods for modifying light passing therethrough; and
  first and second reflectors for receiving modified light from corresponding first optical lenses and reflecting the light toward the limited target areas; and
 a shield interconnected to the support frame and having first and second openings therein, the reflectors reflecting light through corresponding openings in the shield to the limited target areas.

29. The lighting apparatus of claim 28 wherein the light-generating system further includes a pair of second optical lenses, each second optical lens disposed between a corresponding first optical lens and a corresponding reflector for further modifying the light passing therethrough.

30. The lighting apparatus of claim 28 wherein the guide rods are formed from a thermally absorptive material so as to thermally isolate the first optical lenses from the light source.

31. The lighting apparatus of claim 28 wherein the guide rod is a solid quartz rod.

32. The lighting apparatus of claim 28 wherein the guide rods each include an ultraviolet and infrared light-reflecting material such that the input ends of the guide rods reflect ultraviolet and infrared light and discourage the passing of the ultraviolet and infrared light therethrough.

33. The lighting apparatus of claim 32 wherein the guide rod is a solid quartz rod.

34. The lighting apparatus of claim 28 wherein the shield blocks non-reflected light from exiting the apparatus.

35. The lighting apparatus of claim 28 wherein the reflectors are pivotably mounted to the support frame thereby to allow the reflectors to be manipulated to positions wherein the reflected light is directed to the limited target areas.

* * * * *